(12) United States Patent
Antila et al.

(10) Patent No.: US 9,588,334 B2
(45) Date of Patent: Mar. 7, 2017

(54) FABRY-PEROT INTERFEROMETER AND A METHOD FOR PRODUCING THE SAME WITH DECREASED BENDING

(71) Applicant: TEKNOLOGIAN TUTKIMUSKESKUS VTT OY, Espoo (FI)

(72) Inventors: Tapani Antila, VTT (FI); Jussi Mäkynen, VTT (FI); Christer Holmlund, VTT (FI); Jarkko Antila, VTT (FI); Jyrki Ollila, Oulu (FI); Heikki Saari, VTT (FI)

(73) Assignee: TEKNLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 14/399,956

(22) PCT Filed: May 8, 2013

(86) PCT No.: PCT/FI2013/050510
§ 371 (c)(1),
(2) Date: Nov. 9, 2014

(87) PCT Pub. No.: WO2013/167811
PCT Pub. Date: Nov. 14, 2013

(65) Prior Publication Data
US 2015/0124263 A1    May 7, 2015

(30) Foreign Application Priority Data

May 8, 2012  (FI) ..................................... 20125495

(51) Int. Cl.
*G02B 26/00* (2006.01)
*G01J 3/26* (2006.01)
*G01B 9/02* (2006.01)

(52) U.S. Cl.
CPC ............. *G02B 26/001* (2013.01); *G01B 9/02* (2013.01); *G01J 3/26* (2013.01); *G01B 2290/25* (2013.01); *Y10T 29/49826* (2015.01)

(58) Field of Classification Search
CPC ......... G01J 3/26; G02B 26/001; G02B 26/06; G01B 9/02; G01B 2290/25; Y10T 29/49826
See application file for complete search history.

(56) References Cited

U.S. PATENT DOCUMENTS 5,781,292 A * 7/1998 Haas ......................... G01J 3/26
356/519
6,819,492 B1   11/2004 Picard et al.
(Continued)

FOREIGN PATENT DOCUMENTS

JP    2000-187140    7/2000
JP    2002-243937    8/2002
(Continued)

*Primary Examiner* — Michael P Lapage
(74) *Attorney, Agent, or Firm* — Mark M. Friedman

(57) ABSTRACT

The invention relates to a Fabry-Perot interferometer and a method for producing the same. More specifically, the invention relates to Fabry-Perot interferometers which are controllable with one or several actuators, such as piezoelectric, electrostrictive or flexoelectric actuators. In prior art technology there is a problem to achieve a sufficiently small and uniform gap between mirrors. In the present invention an intermediate structure (85a, 85b, 95a, 95b, 81a, 81b, 91a, 91b, 98a, 98b) is used between a mirror and an actuator or between two mirrors. The method of production also includes measuring the width distribution of the gap in several phases, and providing pre-actuation of actuators.

10 Claims, 5 Drawing Sheets

(56) References Cited

U.S. PATENT DOCUMENTS

| | | | |
|---|---|---|---|
| 2004/0027671 A1* | 2/2004 | Wu | G02B 26/001 359/578 |
| 2005/0105849 A1 | 5/2005 | Kim | |
| 2007/0242920 A1* | 10/2007 | Lin | G01J 3/26 385/27 |
| 2010/0097613 A1* | 4/2010 | Saari | G01J 3/10 356/454 |
| 2010/0296164 A1* | 11/2010 | Yasuda | A61B 1/0008 359/579 |
| 2011/0128549 A1* | 6/2011 | Nishimura | G01J 3/26 356/450 |
| 2012/0013905 A1 | 1/2012 | Nozawa | |
| 2013/0038876 A1* | 2/2013 | Arakawa | B81B 7/0035 356/416 |

FOREIGN PATENT DOCUMENTS

| | | |
|---|---|---|
| JP | 2002-277758 | 9/2002 |
| JP | 2006-71678 | 3/2006 |
| JP | 2008-61970 | 3/2008 |
| JP | 2008-512723 | 4/2008 |
| JP | 2008-102269 | 5/2008 |
| JP | 2011053510 | 3/2011 |
| JP | 2011-128185 | 6/2011 |
| JP | 2012-163912 | 8/2012 |
| WO | 9621140 | 7/1996 |
| WO | 2008006446 | 1/2008 |

\* cited by examiner

FABRY-PEROT INTERFEROMETER AND A METHOD FOR PRODUCING THE SAME WITH DECREASED BENDING

TECHNICAL FIELD

The invention relates to a method for producing a Fabry-Perot interferometer, and a Fabry-Perot interferometer. More specifically, the invention relates to Fabry-Perot interferometers which are controllable with actuators, such as piezoelectric, electrostrictive or flexoelectric actuators.

BACKGROUND TECHNOLOGY

Fabry-Perot interferometers are used as optical filters and in spectroscopic sensors, for example. The Fabry-Perot interferometer is based on parallel beam splitter mirrors, whereby a Fabry-Perot cavity is formed into a gap between the mirrors. The pass band wavelength of a Fabry-Perot interferometer can be controlled by adjusting the distance between the mirrors i.e. the width of the gap. It is common to use micromechanical technology for producing Fabry-Perot interferometers because of low production costs of the technology. However, there are some limitations related to the micromechanical technology. The adjustment range of the mirror position is generally low, corresponding to +/−20-25% adjustment range of the wavelength of the interferometer. The maximum adjustment frequency of the mirror is also low, approximately 200-500 Hz. Fabry-Perot interferometers are also commonly made with liquid crystal technology, but this technology has similar deficiencies. Therefore, in many applications it is preferable to use Fabry-Perot interferometers which are based on using controllable actuators between mirrors, such as piezoelectric, electrostrictive or flexoelectric actuators.

FIG. 1 illustrates a prior art Fabry-Perot interferometer 10. The interferometer includes two mirrors 11 and 12, which have a substrate is of transparent material, and the surfaces between the mirrors have a thin metal or dielectric coating 13, 16 in order to provide partial reflection of radiation. Two, three or four actuators 14 are attached with glue at their opposite sides 17 between the mirrors 11, 12. The pass band wavelength of the interferometer is adjusted by applying voltage to the actuators 14. The dimensions of the actuator are controlled by the applied voltage, and thus it is possible to control the distance between the mirrors, i.e. the width of the gap/cavity.

Some disadvantages are related to the prior known Fabry-Perot interferometers in which controllable actuators are used. The electrodes of the prior art Fabry-Perot interferometers are made by coating a metal layer on the mirror substrate. If the interferometer has a very small gap, the electrodes may easily touch each other. In order to avoid the electrodes from touching each other, it is necessary to use a sufficiently wide gap between the mirrors. In other words, it is not possible to provide interferometers with very small gaps.

There is another problem related to achieving a uniform gap between the mirrors. When mirrors are glued to the actuators the glue has a property to shrink during the hardening of the glue. The shrinkage of the glue tends to cause bending of the mirrors, whereby the size of the gap between the mirrors becomes non-uniform. When the gap is not uniform with a required accuracy, this further causes the functional wavelength band of the Fabry-Perot interferometer to become wider and shifted. The bending also increases the risk of the mirrors touching each other, and to avoid such touching of mirrors it is necessary to use a larger average gap between the mirrors.

In order to alleviate the problem due to shrinking of glue, the prior art mirrors are made of thick material in which bending is small. However, the use of thick mirror substrates causes the weight and manufacturing costs of the Fabry-Perot interferometer to become high. The thick mirror substrate also tends to attenuate radiation. This may, for example, cause decreasing of signal-to-noise ratio when a Fabry-Perot interferometer is used in measuring radiation with low intensity.

SUMMARY OF THE INVENTION

The purpose of the present invention is to avoid or reduce disadvantages of the prior art. The purpose of the invention is thus to provide a Fabry-Perot interferometer and a method for producing the same, wherein it is possible to achieve a small, uniform gap between the mirrors with moderate weight and manufacturing cost of the interferometer.

The object of the invention is achieved with controllable Fabry-Perot interferometer, comprising a first mirror, a second mirror in a substantially parallel position with each other and with a gap between the first and second mirrors, at least one controllable actuator between said first and second mirrors for controlling the width of the gap, and electrodes in the mirrors for a capacitive measurement of the gap width, which is characterised in that the Fabry-Perot interferometer comprises an intermediate structure located between a mirror and an actuator and/or between the two mirrors, wherein the intermediate structure is arranged to decrease bending of a mirror and/or to facilitate a small gap between the optically functional areas of the first and second mirrors of the Fabry-Perot interferometer.

In one embodiment of the invention the intermediate structure comprises a recess in at least one of the mirrors on a surface adjacent to the gap, and an active part of the mirror electrode is located in the recess of the mirror. This way it is possible to achieve a small gap between the optical areas of the mirrors as the electrodes do not protrude from the optical surfaces of the mirrors. It is also possible to prevent electrodes from touching each other In one embodiment of the invention the intermediate structure comprises a protrusion at the surface of a mirror for determining the width of the minimum gap between the mirrors. This way it is possible to prevent other parts of the mirror from touching each other when gap is in its minimum value and to avoid bending of the mirrors due to such touching.

In another embodiment of the invention the intermediate structure comprises a bar attached to the surface of an actuator at a first surface of the bar and further attached to an edge of a cavity, such as a through-hole, of a mirror at a second surface of the bar. This intermediate structure reduces bending of the mirrors caused by shrinkage of the attachment glue.

In one embodiment of the invention the intermediate structure comprises a support plate, wherein a mirror is attached to the support plate, and the support plate is attached to the actuator. In a further embodiment of the invention the Fabry-Perot interferometer comprises resilient glue as an adhesive between the mirror and the support plate. If the support plate is bent due to shrinkage of glue between the support plate and the actuators the resilient glue compensates the bending and reduces the bending of the mirror.

In addition to the single cavity interferometers with two mirrors, the invention can also be used for providing interferometers with two or more cavities and thus three or more substrates.

The present invention also concerns a method for producing a controllable Fabry-Perot interferometer, wherein at least one actuator is attached directly or indirectly to a first mirror, and a second mirror is attached directly or indirectly to the second, opposite part of the at least one actuator, characterised in that the attachment of the second mirror to the at least one actuator comprises:

pre-actuating actuators;

placing the second mirror adjacent to the first mirror;

providing a first measurement of width distribution of the air gap between optical surfaces of the mirrors;

moving the second mirror in relation to the first mirror for providing a determined air gap width;

after said moving, providing a second measurement of width distribution of the air gap between optical surfaces of the mirrors;

attaching the second mirror directly or indirectly to the at least one actuator by curing glue;

after said curing, providing a third measurement of width distribution of the air gap between optical surfaces of the mirrors; and analysing the results of the air gap measurements and making decision on acceptance of the Fabry-Perot interferometer on the basis of the results and predetermined acceptance criteria.

Some preferable embodiments of the invention are described in the dependent claims.

Significant advantages can be achieved with the invention when compared to the known solutions. When bending of the mirrors is reduced/avoided it is possible to achieve a gap width which is smaller and more uniform. When the mirrors of the interferometer are accurately parallel a narrow pass band is achieved. With intermediate structures it is also possible to prevent the electrodes and optical areas of the mirrors from touching each other. The inventive method for the production of the Fabry-Perot interferometers also makes it possible to avoid substantial offset voltages in the control of the actuators, whereby a linear behaviour of the interferometer is achieved throughout the adjustment range.

The interferometers according to the invention can be designed for the usage for any radiation within optical range; visible light, ultraviolet (UV) radiation, near infrared radiation (NIR) and infrared radiation (IR). It is only necessary to choose a substrate material for the mirror which is transparent for the operating wavelength, and a suitable material or suitable materials for the mirror surfaces for the operating wavelength range.

The interferometers can be designed to be small-sized if required by the application. The assembly of the interferometers can be made manually or in an automated production line. Also, the cost of required materials is low. Therefore, interferometers according to the invention can be produced with moderate costs in both small and large quantities.

In this patent application the term "mirror" means the combination of a transparent substrate and a reflective surface layer on one or both sides.

In this patent application "actuator" means any structures, of which displacements are electrically controllable. The actuator can be e.g. a piezoelectric, electrostrictive or flexoelectric actuator.

In this patent application "intermediate structure" is used to mean a structure which is attached between an actuator and a mirror or between two mirrors. "Intermediate structure" is not glue or other adhesive alone.

In this patent application the terms "radiation" or "light" are used to mean any radiation in the optical range of wavelengths.

In this patent application "gap width" means the distance between the mirrors at the concerned position, such as at the optically functional area.

In this patent application the expression "mirrors are parallel in relation to each other" means, more specifically, that the reflecting surfaces of the mirrors are parallel in relation to each other.

SHORT DESCRIPTION OF THE DRAWINGS

In the following part the preferable exemplary embodiments of the invention are described in more detail by referring to the enclosed drawings, in which.

DETAILED DESCRIPTION OF THE EMBODIMENTS

Figure 1:
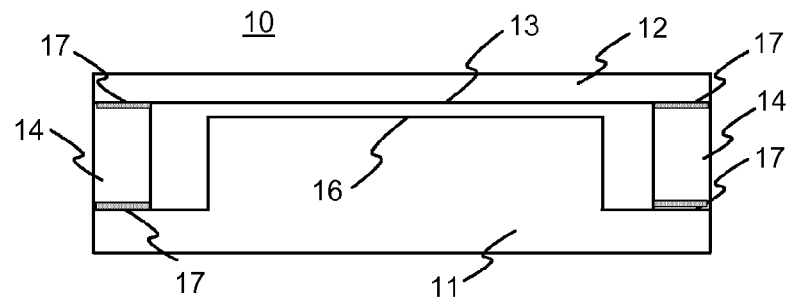
FIG. 1 illustrates a Fabry-Perot interferometer according to the prior art.

FIG. 1 was described in the prior art description above.

Figure 2:
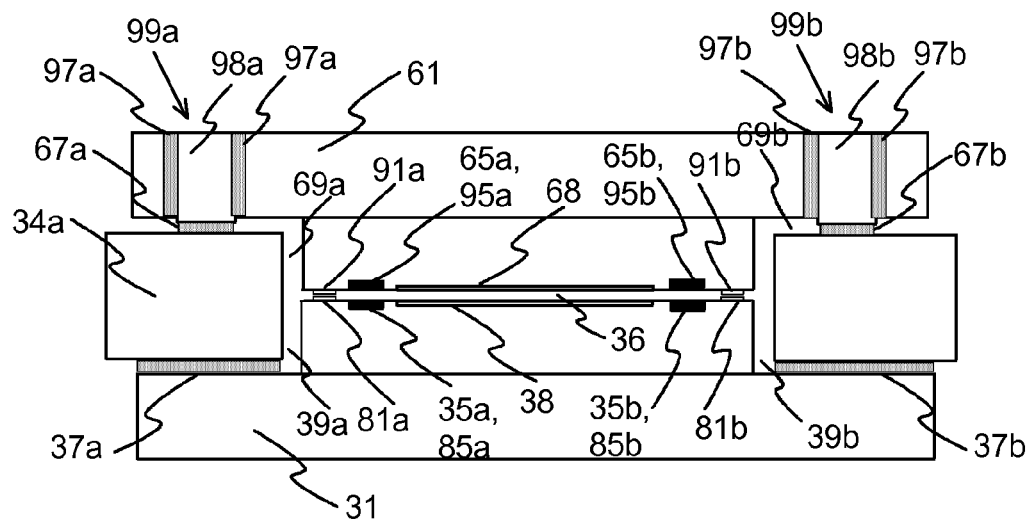
FIG. 2 illustrates a cross section front view of an exemplary Fabry-Perot interferometer according to the invention.
Figure 3:
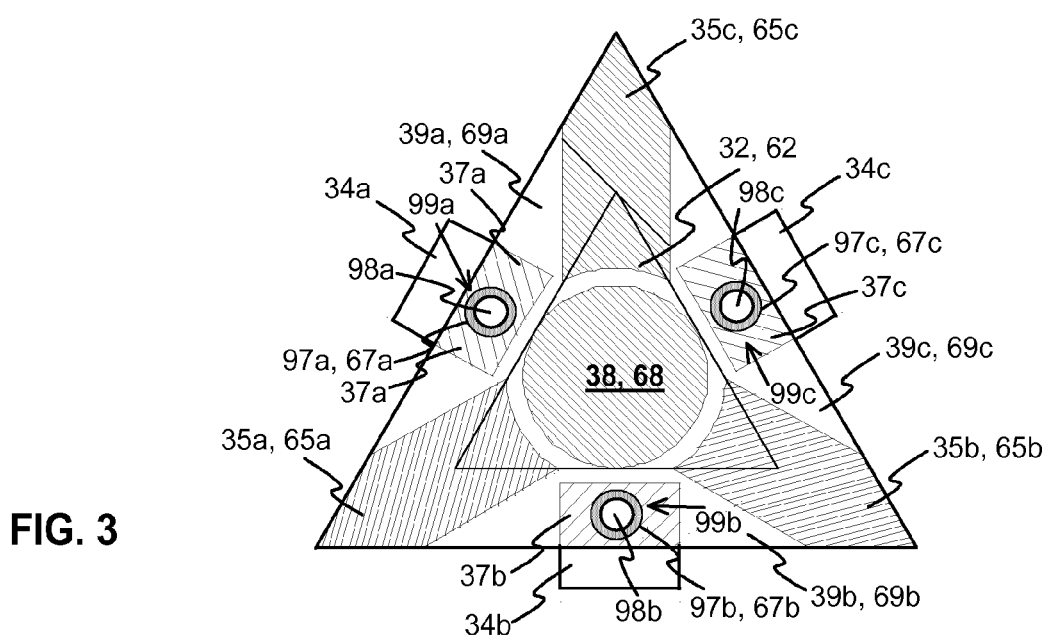
FIG. 3 illustrates a top view of an exemplary Fabry-Perot interferometer according to the invention, wherein in the Figure parts are shown translucent.

FIG. 2 illustrates a cross section view of an exemplary Fabry-Perot interferometer according to the invention. FIG. 3 illustrates an exemplary triangular-shape Fabry-Perot intereformeter. The parts of the interferometer are shown translucent so that the parts are better visible in the FIG. 3.

The illustrated interferometer has two mirrors, a first mirror 31 and a second mirror 61. The mirrors have a substrate of silicon, for example. In the middle of the mirror there is the circular area 38, 68, wherein there is a partially reflecting surface layer in both mirrors, and which area is used for the optical functionality of the interferometer.

Reflecting layers are located at those mirror surfaces which are against the gap 36 between the mirrors. The reflecting layer can be e.g. silver, which is attached to the substrate with titanium, for example. There may also be a protective layer of silicon dioxide on metal mirror. The reflecting layer can also be a dielectric Bragg mirror. The thickness of the silver layer and the protective silicon dioxide layer can be e.g. 40 nm, and the thickness of the titanium layer can be e.g. 4 nm. The substrates may have a recess for these layers. The depth of a recess is preferably equal to the total thickness of the layers, whereby the surface of the mirror is uniform at the boundary between the reflecting area and the surrounding area.

The mirrors have electrodes 35a, 35b, 35c, 65a, 65b, 65c at the mirror surface, which is located against the gap. The electrodes are outside the optically active area of the mirror and extend to corners of the mirrors for electrical connections. The electrodes preferably consist of a metal layer. The mirrors have preferably recesses 85a, 85b, 95a, 95b for the electrodes, and the depth of the recess is preferably at least equal to the thickness of the metal layer, whereby the electrodes do not restrict the minimum distance of the optical surfaces 38, 68 of the mirrors. With electrodes it is possible to measure the width of the gap by measuring the capacitances between the parallel electrodes of the opposite mirrors. By the measurement it is possible to get feedback information on the width of the gap as well as the parallelism of the mirrors during the calibration and use of the interferometer, and this way a more accurate control of the gap is achieved.

FIG. 2 also shows protrusions 81a, 81b, 91a, 91b at the surfaces of the mirrors. The protrusions are located outside the optically functional area 38, 68. The purpose of the protrusions is to define the minimum distance between the mirrors and prevent the optical surfaces of the mirrors and electrodes from touching each other. The protrusions can be same material as the mirror substrates, and they can be attached with glue to the mirror surfaces, for example.

At the side edges of the mirror plates there are recesses arranged for installing actuators. The recesses are cited as 39a, 39b, 39c (first mirror) and 69a, 69b, 69e (second mirror) in FIGS. 2 and 3. The size of the actuators may be, for example, 3 mm×3 mm×3 mm. The actuators 34a. 34b, 34c are attached to the first mirror with layers of adhesive 37a, 37b. 37c, respectively. The second mirror is attached to the actuators 34a, 34b, 34c by using an intermediate bar 98a, 98b, 98c. The intermediate bar is attached to the actuator at its bottom surface with adhesive 67a, 67b, 67c. The upper mirror has holes (also known as through holes) 99a, 99h, 99c for attaching the mirror to the intermediate bars 98a, 98b. 98c. There is a layer of adhesive 97a, 97b, 97c between the edges of the bars 98a, 98b, 98e and mirror holes 99a, 99b Providing the attachment between vertical surfaces prevents the bending of the mirror caused by shrinkage of the glue. The bar with an I-shape is illustrates in the Figures, but it is possible to use other alternative shapes, such as a cone-shape or ⊥, for example. The bar is preferably same material as the mirror substrate, but other alternative materials are also possible. The mirrors are arranged to be in parallel position and with a determined gap between the mirrors. This is achieved by positioning the upper mirror in correct location and alignment with an appropriate jig before the glue between the bar and the mirror is hardened.

The number of actuators in a Fabry-Perot interferometer is usually two, three or four. It is even possible to use only one actuator, which may preferably have a ring shape. In such a case the thick area of the mirrors 32, 62 may have a circular shape and locate partly inside the actuator. Same kinds of attachment and calibration procedures can be used when only one actuator is used. However, with one actuator it is usually only possible to use the actuator for controlling the distance between the mirrors, not the parallelism between them.

Figures 4A, 4C:
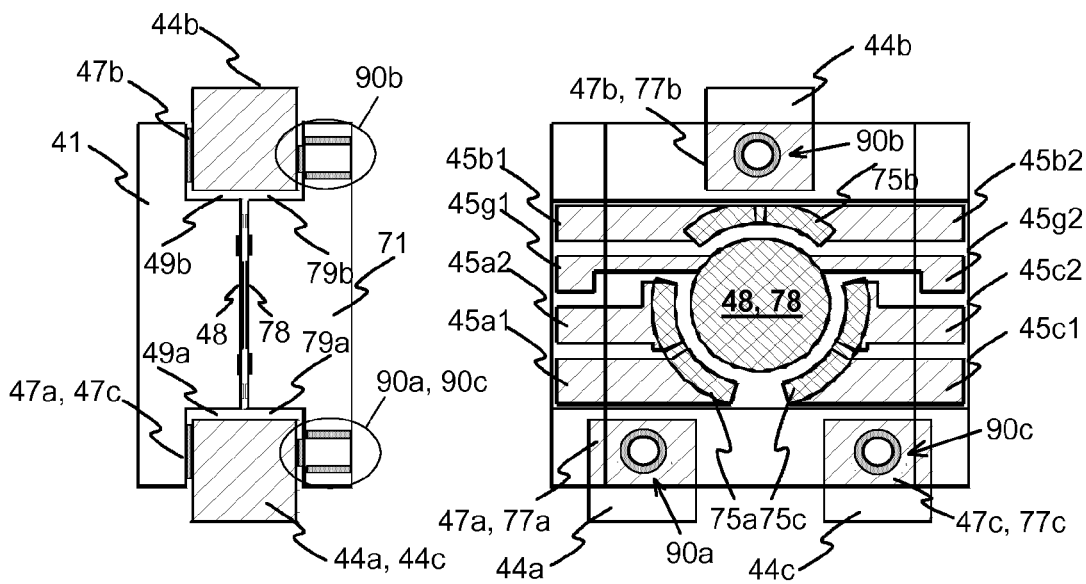
FIG. 4a illustrates a top view of a second exemplary Fabry-Perot interferometer according to the invention, wherein in the Figure parts are shown translucent.
FIG. 4c illustrates a side view of the second exemplary Fabry-Perot interferometer according to the invention.
Figure 4B:
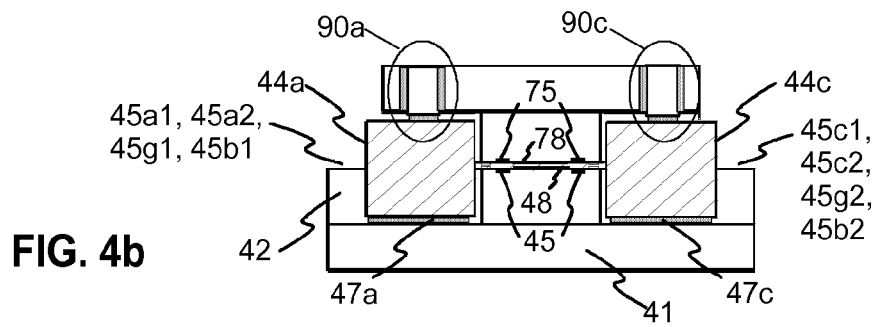
FIG. 4b illustrates a front view of mirrors of the second exemplary Fabry-Perot interferometer according to the invention.
Figures 4D, 4E:
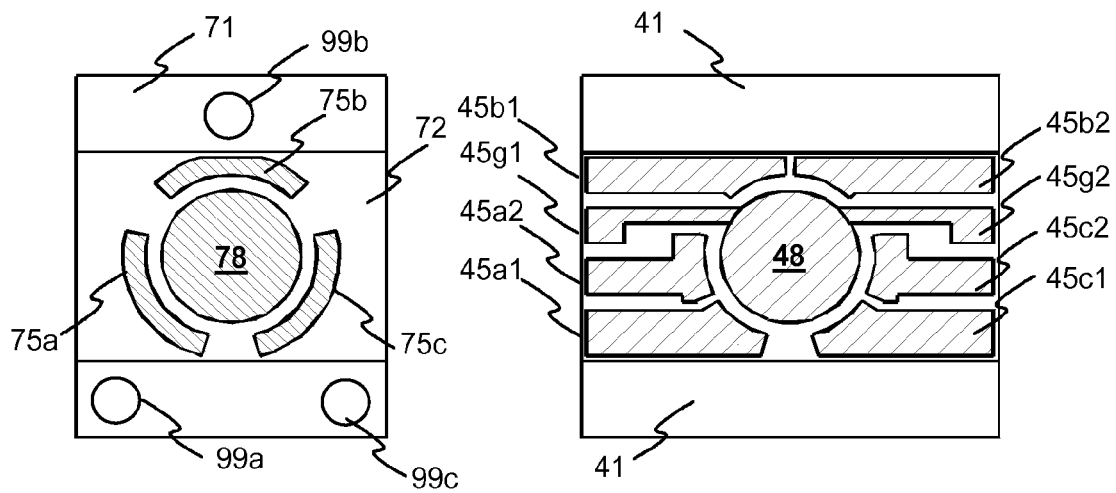
FIG. 4d illustrates a top view of a first mirror of the second exemplary Fabry-Perot interferometer according to the invention.
FIG. 4e illustrates a top view of a second mirror of the second exemplary Fabry-Perot interferometer according to the invention.

FIGS. 4a-4e illustrate a second exemplary embodiment of a Fabry-Perot interferometer according to the invention. This embodiment has rectangular mirrors, and it is especially suitable for production from wafer substrates. FIG. 4a illustrates a top view of the interferometer. The parts of the interferometer are shown translucent so that all parts are visible in the FIG. 4a. FIG. 4b illustrates a front view of the interferometer, and FIG. 4c illustrates a side view of the interferometer. Further, FIG. 4d illustrates a top view of a first mirror, and FIG. 4e illustrates a top view of a second mirror of the interferometer.

The illustrated interferometer has a first mirror 41 and a second mirror 71, which both have a rectangular shape. There are recesses 49a, 49b made at two sides of the first mirror 41, and recesses 79a, 79b made at two sides of the second mirror 71 for the actuators 44a, 44b and 44c. Thus, the mirrors have their larger thickness at the centre areas of the mirrors 42, 72. In the middle of the substrates there is the circular area 48, 78, which is preferably the thickest area of the substrate in a completed interferometer. This area includes a partially reflecting surface in both mirrors, and the area is used for the optical functionality of the interferometer. The reflecting surfaces are located at the mirror surfaces which are against the gap 46 between the mirrors. Suitable materials of the mirror substrate and layers were described above in the description of FIGS. 2 and 3.

The mirror surfaces may also have protrusions as shown in FIG. 2 in order to define the minimum gap between the mirrors and to prevent the optical areas and electrodes from touching each other. Such protrusions can be made of substrate material and glued at the surface of the mirrors, for example.

Electrodes 45 and 75 and can be arranged in an etched recess in the area of the gap 46 as illustrated in FIG. 2. The electrodes are arranged in such a way that it is not necessary to make electrical wiring to the electrodes of the second mirror. This makes the manufacturing of the interferometer easier, and it is also more reliable to provide wire contacts at the non-moving first mirror than the moving second mirror. The capacitance measurement from three positions is made with two electrodes at each position of the first mirror. There is a floating electrode at each respective position of the second mirror, whereby the three electrodes form a series connection of two capacitances, each across the gap between the mirror substrates.

There are thus electrodes for capacitance measurement from three locations of the interferometer. Electrodes 45a1 and 45a2 of the first mirror and electrode 75a of the second mirror form a first group of electrodes for capacitance measurement. Electrodes 45b1 and 45b2 of the first mirror and electrode 75b of the second mirror form a second group of electrodes for capacitance measurement. Electrodes 45c1 and 45c2 of the first mirror and electrode 75c of the second mirror form a third set of electrodes for capacitance measurement. With the three capacitance measurements it is thus possible to determine the distance and relative inclination between the two mirror substrates.

In addition to the measurement electrodes, there may be optional electrical connections 45g1 and 45g2 available to the reflecting layers 48, 78. With these connections it is possible to connect the reflective layers to ground potential, and/or monitoring the contact resistance of the deposited conducting layers.

The interferometer of the FIGS. 4a-4c has three actuators, 44a, 44b, 44c. The size of the actuators may be, for example, 2 mm×2 mm×2 mm. The actuators 44a, 44b, 44c are attached to the first mirror with layers of adhesive 47a, 47b, 47c, respectively. The second mirror is attached to the actuators 44a, 44b, 44c by using an intermediate bar according to the invention. The attachment with the bars 90a, 90b, 90c is similar to the corresponding structure shown in FIG. 2. The second mirror has holes 99a, 99b, 99c for the attachment of the intermediate bar. The attachment is made with glue, and the mirrors have been adjusted so that they have been at correct positions when the glue has been hardened. This way there is a good parallelism and an accurate distance between the mirrors.

Figure 5A:
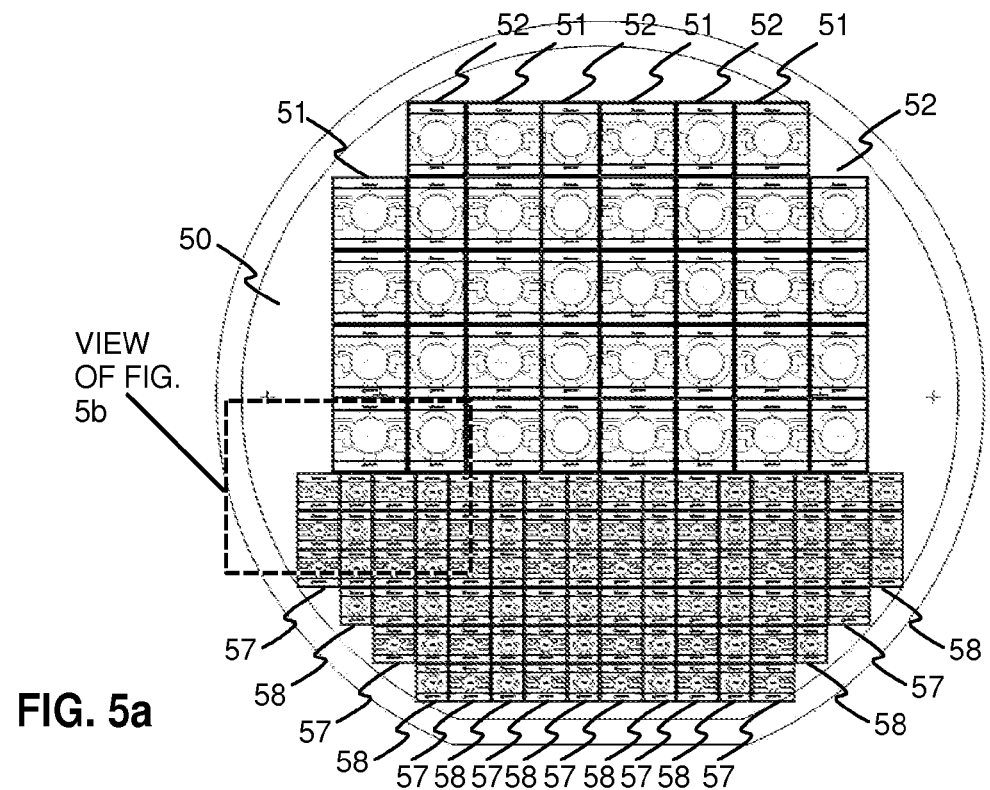
FIG. 5a illustrates a top view of a wafer substrate with a mask for producing mirrors of interferometers according to the invention.
Figure 5B:
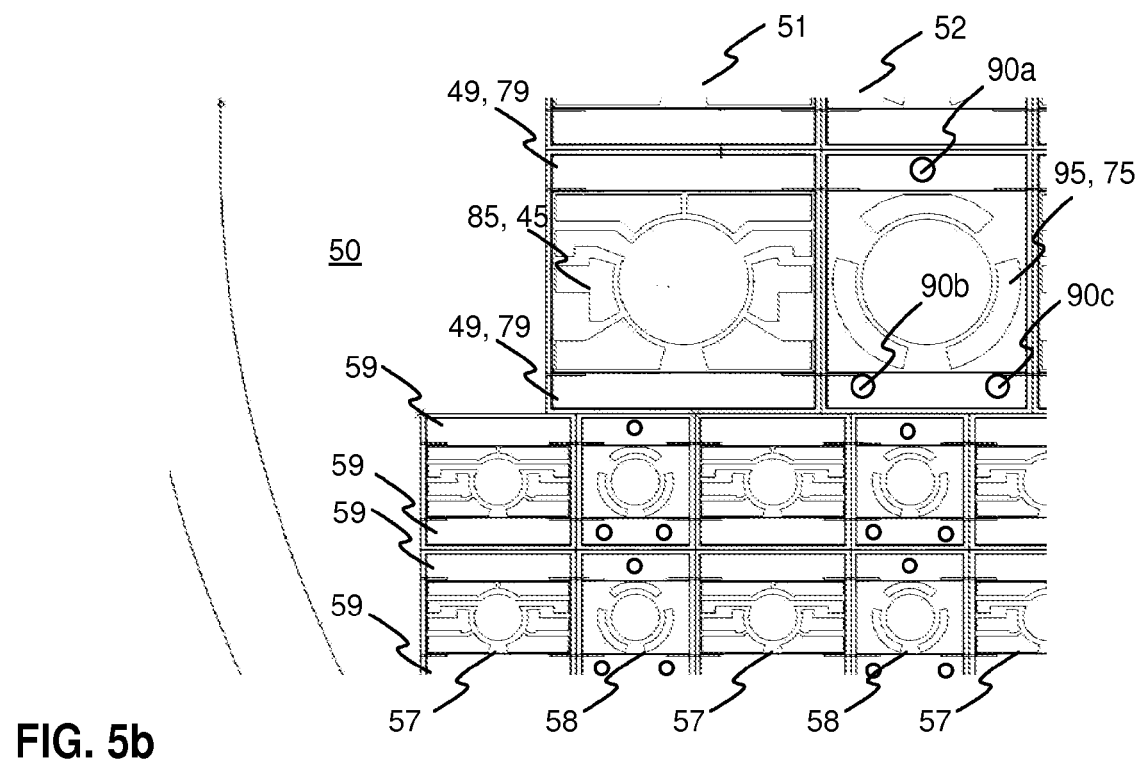
FIG. 5b illustrates an enlarged top view of a part of a wafer substrate with a mask for producing mirrors of interferometers according to the invention.

FIG. 5a illustrates an exemplary wafer substrate 50 for producing mirrors for interferometers according to the invention. FIG. 5b illustrates a part of FIG. 5a enlarged. The FIGS. 5a and 5b also show masks for depositing reflecting layers and electrode layers to the wafer. There are masks for two sizes of interferometers. Columns 51 are masks for a first mirror, and columns 52 are masks for a second mirror for interferometers with larger size. Columns 57 are masks for a first mirror and columns 58 are masks for a second mirror for interferometers with smaller size. Recesses for actuators 49, 79 and recesses 85, 95 for electrodes 45, 75 are etched or machined, as well as holes 90a, 90b, 90c for intermediate beams. After the etching, the circular optical area in the middle of the mirrors remains the highest area. The reflecting and electrode layers are then deposited. Finally, the mirrors can be sawed apart and used for assembling Fabry-Perot interferometers as illustrated in FIGS. 4a-4e, for example.

Figure 6:
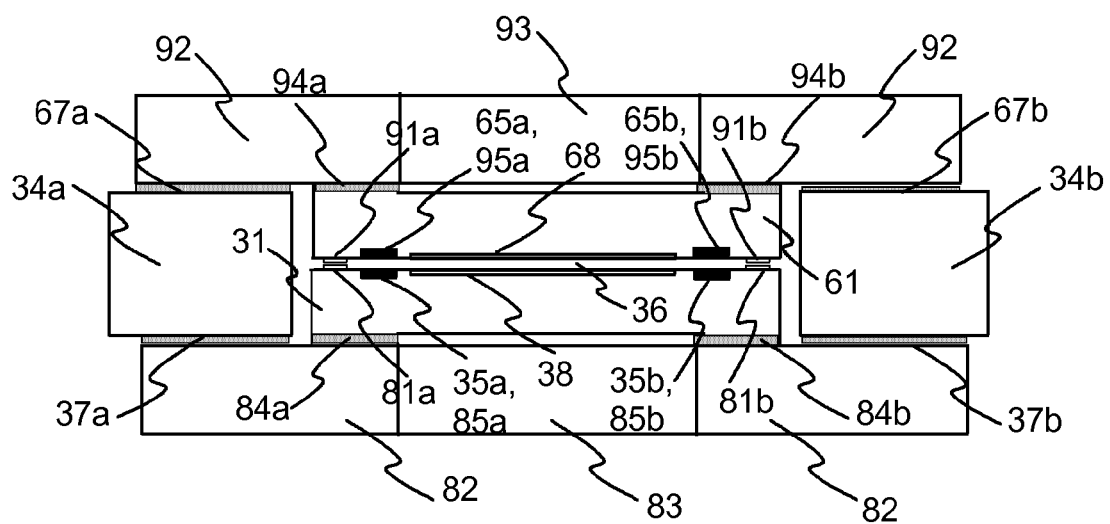
FIG. 6 illustrates a cross section front view of a third exemplary Fabry-Perot interferometer according to the invention.

FIG. 6 illustrates a front view of a third exemplary Fabry-Perot interferometer according to the invention. This embodiment has support plates 82, 92 as intermediate structures between the mirrors 31, 61 and actuators 34a, 34b respectively. The support plates can be made of same material as the mirror substrates, for example. The support plates have a hole 83, 93 in the middle of the plate in order to avoid attenuation of radiation at the optical area of the interferometer. In production of the interferometer the mirrors are first attached to the support plates with glue 84a, 84b, 94a, 94b. Actuators 34a and 34b are then attached to the first support plate 82 with glue 37a, 37b. Finally, the second support plate 92 is attached to the actuators 34a and 34b with glue 67a, 67b. Before attaching the support plate 92 to the actuators, the mirror 61 is adjusted with a jig at correct position and alignment in relation to the first mirror 31.

Resilient glue is preferably used in attaching the mirrors to the support plates, 84a, 84b, 94a, 94b. If the support plates bend due to shrinking of glue between the support plates and the actuators, this does not cause substantial bending forces in mirrors as the resilient glue is able to deform accordingly.

The interferometer of FIG. 6 may have a similar structure of reflecting surfaces 38, 68, and electrodes 35a, 35b, 65a, 65b deposited in recesses 85a, 85b, 95a, 95b as shown in FIG. 2. The mirrors may also have protrusions 81a, 81b, 91a, 91b at their surfaces for determining a minimum width of gap 36.

Figure 7:
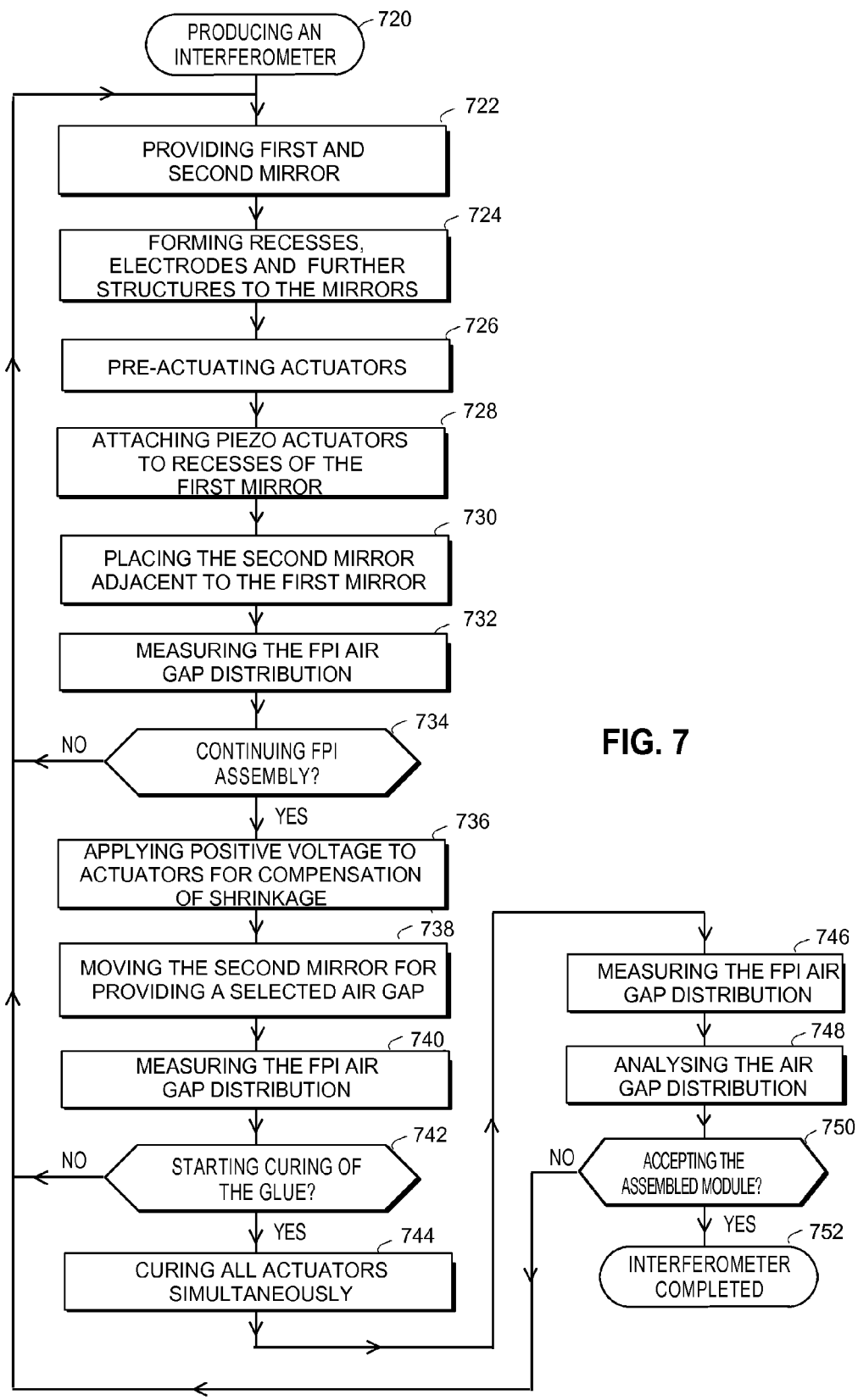
FIG. 7 illustrates a flow diagram of an exemplary method according to the invention for providing a Fabry-Perot interferometer.

FIG. 7 illustrates a flow diagram of an exemplary method according to the invention for producing a Fabry-Perot interferometer, 720. In the method, a first mirror and a second mirror are first provided in phase 722. In assembly, the first mirror is normally a lower mirror and the second mirror is an upper mirror. However, the mirrors may alternatively be in other parallel positions during the assembly. The mirrors may preferably have triangular, rectangular, hexagonal or circular form. The mirror substrate is made of material which is transparent for the radiation which will be applied in using the interferometer. The substrate material can be e.g. fused silica ($SiO_2$) substrate, or if interferometer is used for infrared radiation of longer wavelengths, e.g. silicon can be used.

The substrates of the mirrors are coated with a thin layer of e.g. silver or other material or materials on their one surface in order to achieve beam splitter mirrors. Titanium can be used as an adhesive between the substrate and the silver layer. And further, a protective layer of e.g. silicon oxide ($SiO_2$) can be formed on the surface of the silver layer.

Next in phase 724 recesses are formed at the side edges of the mirrors for attachment of actuators. It is possible that recesses are also made for electrodes. After the recesses are machined or etched, metal electrodes are deposited. The material of the electrode can be e.g. copper, Au, or other metal. The purpose of the electrodes is to facilitate capacitive measurement of the distance between the mirrors. Such a measurement can be used as a feedback when the distance between the mirrors is controlled with actuators. Depending on the shape of substrates is used, it is also possible that the electrodes are deposited into a single plane, and the deposition can be made before or after the machining of the substrate. Further, it is possible to attach protrusions at the surfaces of mirrors, as shown in FIG. 2, in order to determine the minimum width of the gap and in order to prevent touching of the optical surfaces and electrodes with each other. An further, if intermediate support plates according to FIG. 6 are used, they may be attached to the mirrors in this phase.

In phase 726 actuators are pre-actuated. Piezoelectric actuators, for example, show hysteresis as a function of applied voltage. The geometry of the piezoelectric actuator changes when voltage is applied to the actuator. When a zero voltage is applied to the piezoelectric actuator after driving the voltage up for the first time the geometry does not completely return to the initial shape. As the length of the actuator increases this tends to restrict the minimum usable air gap of the interferometer. However, if a maximum allowed voltage is applied to the actuator for several times, such as at least five times, before assembling the interferometer module the drift caused by the hysteresis is substantially avoided.

In phase 728 actuators are attached to the recesses of the first mirror. The attachment can be made by e.g. using adhesive. After attaching the actuators, the second mirror is placed adjacent to the first mirror and the actuators in phase 730. The second mirror is placed in such a position where the actuators will partly locate at the recesses of the second mirror, and the reflecting surface of the second mirror will be at a short distance against the reflecting surface of the first mirror. If protrusions are provided at the surfaces of the mirrors, the mirrors can be placed so that the protrusions touch each other.

In phase 732 the width distribution of the air gap of the Fabry-Pero interferometer (FPI) is measured and adjusted. Transmission spectrum is recorded at several locations at the optical aperture of the interferometer. For each measurement point an air gap value is searched which provides the best match for the measured spectra with simulated spectra.

In phase 734 a decision is made on whether the FPI assembly is continued on the basis of determined acceptance criteria for the air gap distribution width. If assembly is not continued the process returns to phase 722.

Next in phase 736 a positive voltage is applied to the actuators for compensating the shrinkage of glue during curing. In phase 738 the second mirror is moved/lifted in relation to the first mirror by an amount that sets the FPI air gap to a selected value which is based on the measured shrinkage of the used glue. The mirror is preferably moved by using an appropriate jig which is attached to the mirrors and which has a fine adjustment of the mirror position. In phase 740 the width distribution of the air gap of the FPI is further measured in accordance with phase 732. Based on the measurement it is decided whether the glue is cured or whether the assembly is discontinued, phase 742. If it is decided to start curing the curing is made for the attachment of all actuators of the FPI simultaneously in order to reduce/avoid bending, phase 744. The curing is made by applying radiation ultraviolet light, for example.

In phase 746 the voltage of all the actuators is set to zero, and width distribution of the air gap of the FPI is measured in accordance with phase 732. The width distribution of the air gap is also measured for several actuator voltages which are applied by first raising the actuator voltage to highest value and then decreasing the voltage in steps back to zero. The measurement results are analysed in phase 748, and based on the results of the analysis and determined acceptance criteria it is decided whether the FPI module is accepted, phase 750. If the module is accepted, the process for manufacturing the interferometer is completed, 752.

The above production phases can be made manually or with automated machinery. The manual assembly/adjustment is useful in producing small quantities of interferometers, and the automated assembly/adjustment is useful in producing large quantities of interferometers.

It is also possible to use the invention for providing double cavity interferometers. In this case, a second set of actuators is attached to the second (or first) mirror, and a third mirror is positioned and attached to the second set of actuators similarly as the second mirror was positioned and attached to the first set of actuators. Also, interferometers with higher number of cavities can be produced by increasing the number of mirrors in a similar manner. Multi-cavity interferometers might also require mirrors which are coated on both sides.

The invention has been described with the reference to the enclosed embodiments. It is, however, clear that the invention is not restricted only to those, but it comprises all embodiments which can be imagined within the inventive idea and the enclosed patent claims.

For example, some materials, dimensions and forms have been mentioned as examples for implementation of the invention. However, it is clear that dimensions, forms and materials as well as position of actuators and electrodes for gap measurement can be changed and optimised for each implementation according to the specific requirements.

Above, it was described an interferometer with triangular and rectangular mirror elements. However, the elements can as well have some other shape, such as hexagonal shape or circular shape.

The embodiment described above has three actuators. This is a preferable amount of actuators because it is a minimum number of actuators which allows the control of the mirror inclination in all angle directions. However, the inventive solution is still not limited to using three actuators, but the solution can be applied with other number of actuators, such as one, two or four, as well. The actuators are preferably symmetrically positioned around the optically functional space of the interferometer. However, it is also possible that the actuators are positioned asymmetrically.

In attaching the mirrors and actuators it is preferable to use adhesive which can be hardened by radiation, because of its easy usage, quick attachment, and low cost. However, it is also possible to use other means of attachment instead.

In the above embodiments recesses are made to the side edges of the mirrors for the attachment of the actuators. However, it is also possible to provide other kinds of spaces for the actuators, such as hollows. It is also possible that the space for the actuators is not machined, but the form of the mirror is achieved by stacking two or several mirror substrates one on the other, whereby the substrates have different sizes and/or forms.

The actuators may preferably be piezoelectric actuators, but it is also possible to use other types of electrically controllable actuators, such as electrostrictive or flexoelectric actuators.

The inventive interferometers have several preferable applications. They can be used as controllable filters in optical spectrometers, analyzers and imagers, for example. Such spectrometers, analyzers and imagers are commonly used in chemical/biological laboratories in research, industry, and health care, for example. The interferometers may also be used as parts of optical sensors. An example of a suitable application for Fabry-Perot interferometers according to the invention is described in publication WO2007/135244.

The invention claimed is:

1. A controllable Fabry-Perot interferometer, comprising:
   a first mirror,
   a second mirror in a substantially parallel position with respect to said first mirror, and spaced apart from said first mirror so as to define a gap of a controllable width between said first mirror and said second mirror,
   at least one controllable actuator between said first mirror and said second mirror for controlling the width of the gap,
   said first mirror and said second mirror including electrodes for a capacitive measurement of the width of the gap, and,
   an intermediate structure located substantially within at least one of the first mirror or the second mirror, wherein the intermediate structure is arranged to decrease bending of at least one of the first mirror or the second mirror of the Fabry-Perot interferometer, said intermediate structure including a bar including at least a first surface and an adjacent second surface, said first surface in communication with said at least one controllable actuator, and said second surface of said bar in communication with a through hole in at least one of said first mirror or said second mirror.

2. The controllable Fabry-Perot interferometer according to claim 1, wherein, said first surface is attached to said at least one controllable actuator, and said second surface is attached to said through hole in at least one said first mirror or said second mirror.

3. The controllable Fabry-Perot interferometer according to claim 1, wherein the interferometer comprises glue as an adhesive between the first mirror and at least one controllable actuator, and the intermediate structure and the at least one controllable actuator.

4. The controllable Fabry-Perot interferometer according to claim 3, wherein the at least one controllable actuator includes three controllable actuators.

5. The controllable Fabry-Perot interferometer according to claim 4, wherein the controllable actuators are at least one of piezoelectric, electrostrictive or flexoelectric, actuators.

6. The controllable Fabry-Perot interferometer according to claim 4, wherein the first mirror and the second mirror are arranged to define a recess therebetween, and the actuators are bounded within the recess.

7. A method for making a controllable Fabry-Perot interferometer, comprising:
 providing:
  a first mirror,
  a second mirror in a substantially parallel position with respect to said first mirror, and spaced apart from said first mirror so as to define a gap of a controllable width between said first mirror and said second mirror,
  at least one controllable actuator between said first mirror and said second mirror for controlling the width of the gap,
  said first mirror and said second mirror including electrodes for a capacitive measurement of the width of the gap, and,
  an intermediate structure located substantially within the second mirror, wherein the intermediate structure is arranged to decrease bending of at least one of the first mirror or the second mirror of the Fabry-Perot interferometer; and,
 attaching said first mirror to said at least one controllable actuator; and,
 attaching said intermediate structure to said at least one controllable actuator, comprising:
  attaching said intermediate structure including a bar, such that a first surface of said bar is in communication with said at least one controllable actuator, and a second adjacent surface of said bar is in communication with a through hole in at least one of said first mirror or said second mirror.

8. The method according to claim 7, additionally comprising: attaching the intermediate structure and the at least one controllable actuator using an adhesive, including glue, and, attaching said first mirror to said at least one controllable actuator using an adhesive including glue.

9. The method according to claim 8, wherein the attaching between the controllable actuator and the second mirror comprises:
 attaching the first surface of the bar to the surface of the controllable actuator; and,
 attaching the second surface of the bar to a through-hole in at least one of the first mirror or the second mirror.

10. The method of claim 7, additionally comprising: arranging the first mirror and the second mirror to define a recess therebetween.

* * * * *